Figure 7:
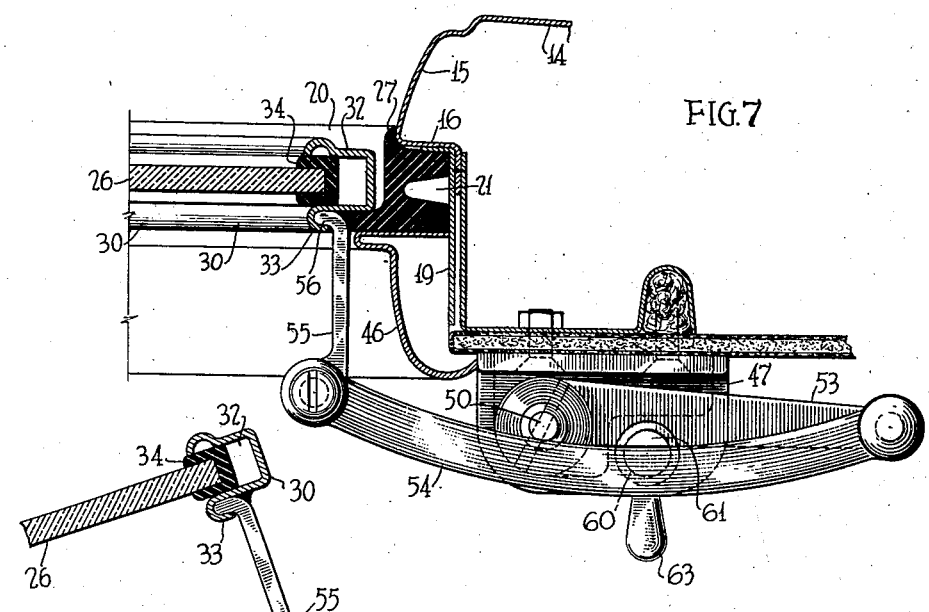

Oct. 20, 1936.　　　　J. LEDWINKA　　　　2,058,328
VEHICLE BODY CONSTRUCTION
Filed Dec. 21, 1936　　　4 Sheets-Sheet 1
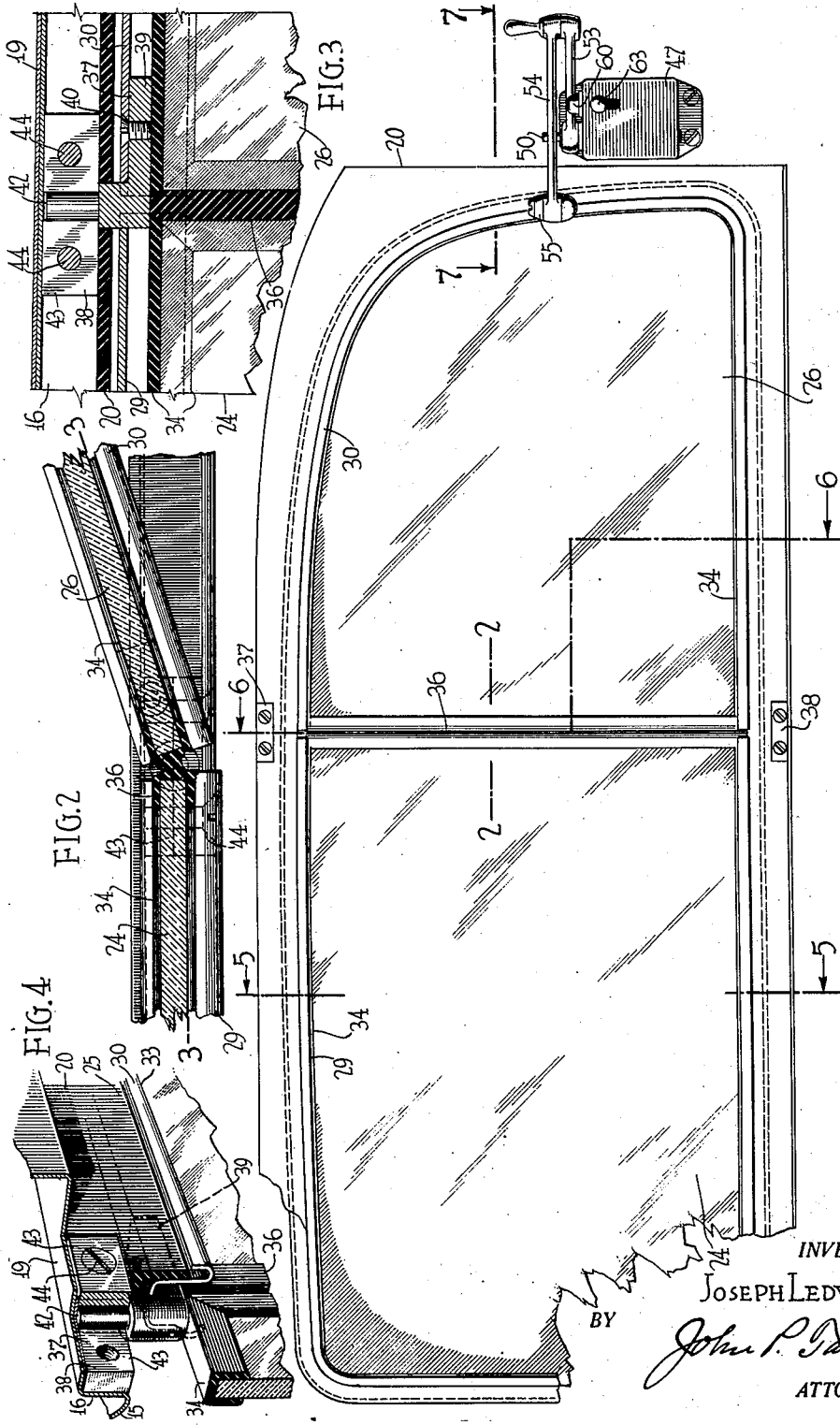
INVENTOR.
JOSEPH LEDWINKA.
BY
John P. Barbox
ATTORNEY.

Oct. 20, 1936.  J. LEDWINKA  2,058,328
VEHICLE BODY CONSTRUCTION
Filed Dec. 21, 1936  4 Sheets-Sheet 2
FIG.5
FIG.6
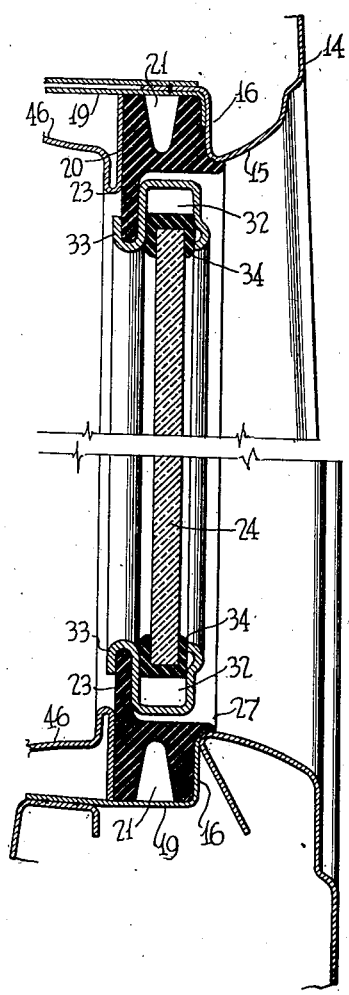
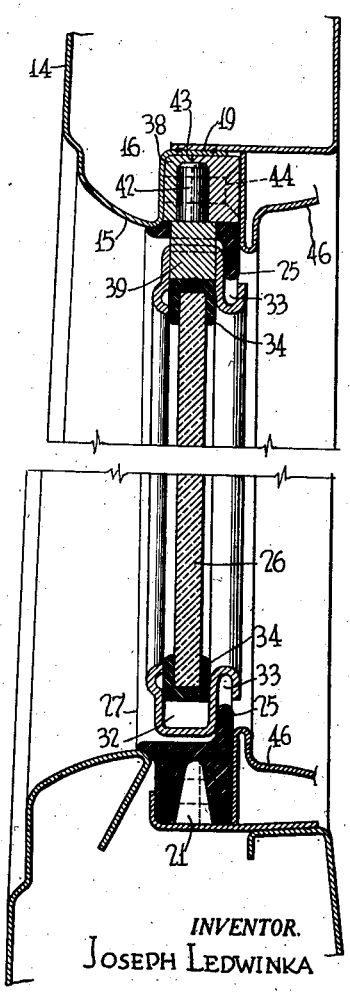
INVENTOR.
JOSEPH LEDWINKA
BY
ATTORNEY.

INVENTOR.
JOSEPH LEDWINKA
BY
ATTORNEY

Oct. 20, 1936.    J. LEDWINKA    2,058,328

VEHICLE BODY CONSTRUCTION

Filed Dec. 21, 1936    4 Sheets-Sheet 4

INVENTOR.
JOSEPH LEDWINKA.
BY
John P. Tarbox
ATTORNEY.

Patented Oct. 20, 1936

2,058,328

UNITED STATES PATENT OFFICE 2,058,328

VEHICLE BODY CONSTRUCTION

Joseph Ledwinka, Philadelphia, Pa., assignor to Edward G. Budd Manufacturing Company, Philadelphia, Pa., a corporation of Pennsylvania Application December 21, 1933, Serial No. 703,357

8 Claims. (Cl. 296—44)

My invention is a vehicle window structure, particularly of the so-called no-draft type in which a glass is divided into a stationary leading portion and a hinged trailing portion for a streamline position exterior of the body converging forwardly from a position spaced from the body to a position adjacent thereto, and whereby drafts or air swirls inside the vehicle are prevented.

Windows of this type have heretofore presented considerably difficulty of construction and undesirable features of operation, particularly where employed in combination with the usual perpendicularly movable glasses, and, even where employed without such glasses, have required the assembly of many small pieces built successively into the body.

A main object of my invention is to provide a no-draft window which may be completely assembled as a unit away from the vehicle body and then, as desired, be quickly and easily thrust into position and completely sealed and secured with a few simple operations.

Attending such main object are other objects conducing to effective operation, simplicity and durability in construction and economy of manufacture, which are attained by the employment of a novel glass-edge guard, a hinge seal, a control means providing a window-operating force or means responsive to movement of the window to any position for automatically locking it in such position, and other features of advantage which will hereinafter appear.

In a preferred form, and in general, a sheet metal vehicle body has an opening surrounded by a generally horizontal inwardly-extending finish molding merging into an upright perimetral shoulder radiating away from the molding and terminating in an inner horizontal flange of greater diameter than the molding; this structure being in one or more pieces as desired, and constituting a receptacle for the telescopic reception of the window unit.

The unit comprises a relatively heavy preferably soft rubber frame defining the outermost limits of the unit on or within which the other parts are supported and which is adapted to be thrust normal to its plane, from within the vehicle, outwardly thereof and into the above-mentioned inner body flange against the adjacent radiating perimetral shoulder. An inner finish molding is then also telescopically thrust into the body flange against the rubber frame and suitably secured to the body.

The rubber frame has an inwardly-radiating perimetral fin or flange of different depth, the portion of greater depth being opposite a stationary sheet metal glass edge guard and the portion of lesser depth surrounding the position of a similar glass edge guard for hinged movement with its glass out of the plane of the unit frame. These guards, forming components of a composite glass edge guard frame, and are of substantially C-shape in side contour and are hinged together at the adjacent facing ends thereof by hinges confined within the space defined by the rubber frame.

The guards are, in perimetral or cross-section, of substantially S-section providing oppositely-opening channels facing toward and away from the window in the direction of the plane thereof; the channels facing the window being adapted to receive rubber seal strips of channel section in which the glasses are disposed. The outwardly-opening channel of the stationary guard embraces the fin portion of greater depth in tightly sealed relation thereto, this relation also serving to support and stabilize the inner unit parts. Since the hingedly movable guard, like the stationary guard, follows the outer contour of a symmetrical window, the fin of lesser depth on the main frame is thereby kept out of the channel of the adjacent guard which has a portion for engaging the outer side of the fin and thereby sealing the hinged glass element in the closed position thereof.

A seal between the adjacent hinged edges of the component glass elements is preferably in the form of a soft rubber strip having oppositely facing portions of channel section embracing these edges and so extending to the seals in the guard channels and to the main seal frame as to effect a substantially perfect seal all about the unit and between its movable parts.

Figure 8:
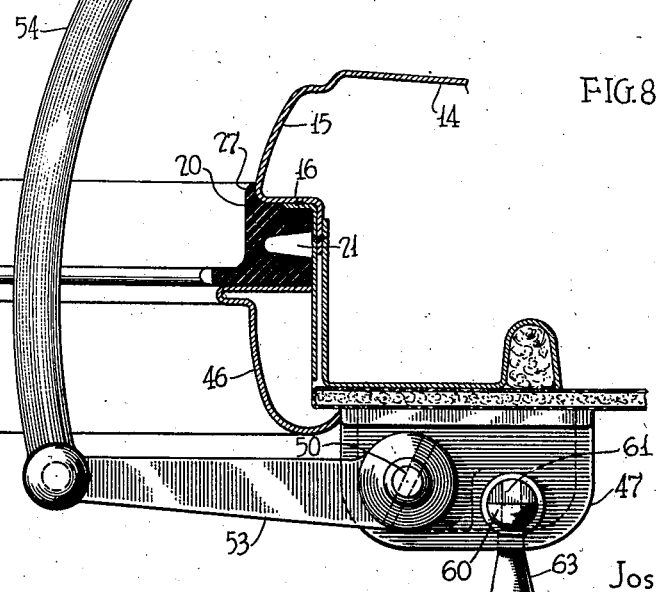
Figure 10:
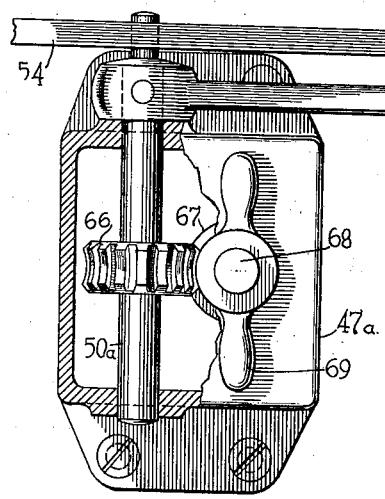
Figure 9:
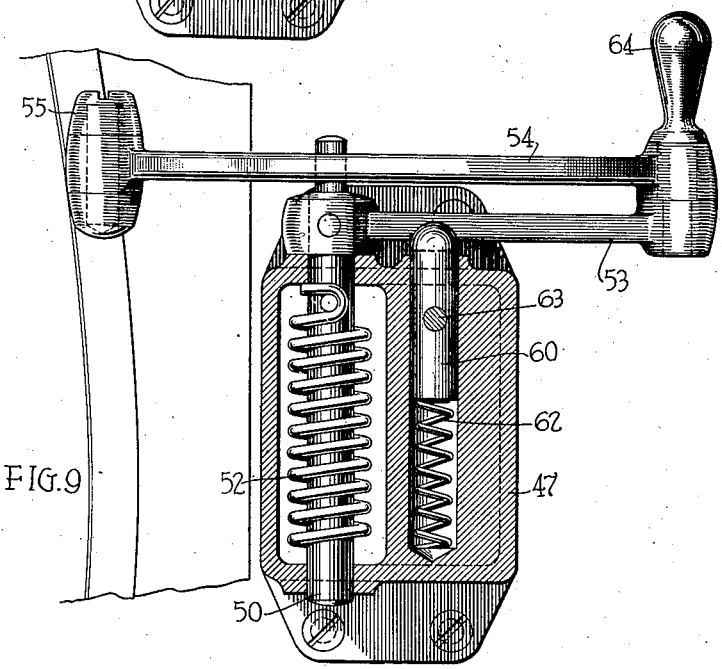

Associated with the opening edge of the hinged glass element, an operating or control mechanism is provided, which, in one form, may include a source of window operating force for release by a simple latch-release effect, or, in a preferred form is such that, in response to movement of the window to any position to which it may be so moved, it automatically locks the window in such position. The invention will be better understood by reference to the following description and the accompanying drawings, in which:

Figure 1 is a view, in side elevation, of a window unit of the invention, the view being taken from the interior of a vehicle, and parts being broken away, Figure 2 is an enlarged sectional view, taken along the line 2—2 of Fig. 1, Figure 3 is a detail side view, partially in elevation and partially in section, taken substantially along the line 3—3 of Fig. 2, Figure 4 is a fragmentary perspective of the parts shown in Figs. 2 and 3, Figures 5 and 6 are enlarged views, taken along the lines 5—5 and 6—6, respectively, of Fig. 1, Figure 7 is an enlarged view taken along the line 7—7 of Figure 1, showing, in top plan, a window operating mechanism of the invention in the positions assumed in the closed position of the window, Figure 8 is a view similar to Fig. 7, with the parts disposed as related in the open position of the window, Figure 9 is a view, partially in side elevation and partially in vertical plane of the operating mechanism, in the positions of the parts as indicated in Fig. 7, and Figure 10 is a view, similar to Fig. 9, of a modified form of control or window operating mechanism of the invention.

Referring particularly to Figs. 1 to 6, inclusive, an outer side panel 14, Figs. 5 and 6, of a sheet metal automobile body, has a window opening about which is disposed a generally horizontal inwardly-extending finish molding 15 merging into an upright perimetral shoulder 16 and terminating inwardly in a horizontal flange 19; these parts being variously of one or more shapes or parts in various relations, as indicated, but which are not germane to this invention, except in the provision of the general shape described.

A heavy soft rubber frame 20 having a peripheral channel 21 providing greater compressive yieldability for sealing it against the shoulder 16, has an inner fin or flange, which, as viewed in Figs. 5 and 6, is of different depths; a portion 23, Fig. 5, being of greater depth and disposed about three sides of a stationary glass 24, and a portion 25, Fig. 6, being of lesser depth and disposed about a movable glass 26. The frame 20 may also have a bead 27 for seating and better sealing it against the edge or fillet between the outer finish molding 15 and the shoulder 16.

Sheet metal glass guard or edge trim members 29 and 30 of substantially C-shape in side contour, as viewed in Fig. 1, embrace the horizontal and remote perpendicular edges of the stationary and movable component glasses 24 and 26, respectively, of the composite glass of the window, and are of substantially S-section, as better seen in Figs. 5 and 6, providing oppositely opening channels 32 and 33 respectively facing toward and away from the glasses, the channels 32 having therein rubber seal strips 34 of channel section in which the glasses are disposed.

As indicated in Fig. 5, the channel 33 of the stationary glass guard 29 embraces the fin portions 23 of greater depth in tightly sealed relation thereto, and, as indicated in Fig. 6, the channel 33 of the movable glass guard 30 does not embrace the fin portion 25; sealing impingement between the movable guard 30 and the fin portion 25 in the closed position of the window being between the outer side of the fin and the inner side of the channel portion 32. This construction provides stable support and effective sealing between the guard 29 and the fin portion 23, permits the guards 29 and 30 to be constructed from stock of the same shape and provides for opening the glass 26 clear of its adjacent fin portion.

As seen more clearly in Figs. 1, 2 and 3, a soft rubber strip 36 has a cross section reduced at the center and providing oppositely facing channels embracing adjacent hinge edges of the glasses 24 and 26 between which it is disposed. It also has a diagonal frame fit, see Fig. 4, between the ends of adjacent seal strips 34 and impinges the main rubber frame 20, this arrangement thus providing a close seal about each glass and between the unit and the body.

Upper and lower metal hinges 37 and 38 coaxial with the hinge seal 36, each comprises a body 39 secured to the guard 30, as by a screw 40, and having a trunnion 42 in a longitudinally halved journal 43 held together by screws 44; these hinges being embedded in, or lying within the space defined by the main rubber frame 20.

The unit, as above constructed, with all of the parts numbered from 24 to 44, carried by the main or heavy rubber frame 20, is preferably an assembly effected separate and apart from the body, and, as desired, brought to position inside the vehicle and thrust outwardly normal to the plane of the window into the tubular flange 19 against the upright shoulder 16. It may, of course, also carry with it an operating mechanism or parts thereof to be hereinafter described, or these parts may be separately assembled.

After placing the unit, a sheet metal inner finish molding or frame 46, as shown more clearly in Figs. 5 and 6, is also telescoped into the flange 19 and secured in place, as by a snap-action device, screws or any other suitable means.

Referring particularly to Figs. 1, 7, 8 and 9, an operating or control mechanism comprises a box 47 for attachment to the vehicle body inside the window; a main shaft 50 journaled therein being biased by a spring 52 to turn clockwise as viewed in the drawings. This shaft has fixed thereto a lever 53 to the outer end of which is pivoted a second lever 54 having pivoted to its outer end a shaft arm or link 55 of thinner stock, and having a hook-like end 56, Fig. 7, in the channel 33 of the movable glass guard at the upright edge of the composite glass remote from the hinge strap 36 and held by the main rubber frame or otherwise secured.

A plunger 60 having a hemi-spherical upper end providing a rectangular shoulder 61, is biased upwardly by a spring 62 and has a handle 63 projecting through a vertical slot in the box 47.

Being biased clockwise by the spring 52, the lever 53, in the closed position of the window illustrated in Figs. 1, 7 and 9, is disposed on the angular shoulder 61 of the pin 60. When it is desired to open the window, it is only necessary to depress the handle 63, which movement releases the lever 53 and permits it to move the parts to the open position of the window illustrated in Fig. 8, this movement causing the glass 26 and associated guards 30 to pivot about the axes of the hinges 37 and 38, and the hinge seal 36 to flex about to center. To close the window, a handle 64 is grasped and the parts moved through a reverse movement, during which the lever, engaging the hemi-spherical head of the pin 60, depresses this pin and causes it to snap back into position holding the lever 53 in the closed position of the window. An actuating force is thus provided for operating the window in open direction between limits, in response to a simple release movement.

In the modification of the operating mechanism shown in Fig. 10, the shaft 50a in the casing 47a, instead of being spring and manually controlled, as in the previous form, is provided with a worm wheel 66 which is engaged by a worm screw 67 on a shaft 68, on which a handle 69 is also mounted.

By turning the handle 69, the above-described opening and closing movements of the window may be readily effected, but with the advantage that the window may be adjusted to any degree of opening desired at a position in which the window instantly locks upon discontinuance of movement of the handle, and may not be moved out of such adjustment by force against the window, or in any way, except by movement of the handle.

What I claim is:

1. In a vehicle, a body having an opening, and a window assembly including a unit frame for the opening, a glass for the unit frame including an element stationarily mounted thereon and a hinged element for movement out of the plane of the frame, and a one piece seal member having oppositely facing channel portions hingedly relatively movable parallel to the channels and embracing the adjacent hingedly movable edges of the glass elements.

2. In a vehicle, a body having an opening, and a window unit therefor comprising an outer seal frame, glass-guards of channel section supported by the seal frame, seal elements of channel section in the channels of the guards, glass members in the channels of the channelled seal elements, a hinge seal between adjacent edges of the glass members, and hinges coaxial with the hinge seal secured between the guards.

3. In a vehicle, a body having an opening, a window assembly for placement as a unit laterally against the body over the opening, and a frame for surrounding the unit and holding it to the body, said unit comprising an outer seal frame, a glass-edge guard frame inwardly of said seal frame including a stationary portion and a vertically hinged portion, upper and lower hinges securing said portions to each other, glasses in said guard-frame portions, seal elements between the glasses and said portions, and a hinge seal between adjacent upright edges of said glasses, said unit holding frame pressing against the outer seal frame.

4. The combination with a sheet metal vehicle body having a window opening of a window unit therefor comprising an outer soft rubber frame, sheet metal glass guards of channel section in the rubber frame, rubber elements of channel section in the guards, glasses in the rubber channel elements, a one piece rubber hinge having oppositely facing channel portions embracing adjacent edges of the glasses, and metal hinges coaxial with the rubber hinge secured between the guards, and a frame pressing against the outer rubber frame and held to the body.

5. A vehicle window comprising a body window frame, and a window unit including a complementary seal frame having an inner flange, a sheet metal glass guard frame having portions of reverse opening channel section, one of which embraces said flange, and a glass in the other portion.

6. A vehicle window comprising a body window frame, and a window unit including a composite frame complementary thereto embodying component facing portions of substantially C-shape, hinges joining the adjacent ends of the component portions, glasses sealed to the component portions, and means sealing the hinges and the glasses to each other in any relative position and sealing the component portions thereabout in closed position relative to the body frame.

7. In a vehicle, a sheet metal body having a side opening about which there is a generally horizontal inwardly extending outer finish molding merging into an upright shoulder radiating away from the molding and terminating in an inner horizontal flange of greater dimension than the molding, a relatively heavy soft rubber frame closely fitting said flange against said shoulder and having an inwardly radiating perimetral fin, sheet metal glass guard frames of C-shape hinged together at the ends and having a section providing reverse opening channels, corresponding channels of the guards each receiving a glass and a glass-edge seal of channel section, and the opposed channel of one of the guards embracing said fin, the fin opposite the opposed channel of the other guard lying outside such channel, a soft rubber strip of reverse opening channel section embracing adjacent hinge edges of the glasses, and a sheet metal inner finish molding frame fitting said inner horizontal body flange against said heavy rubber frame.

8. In a vehicle, a window frame, a window glass in said frame comprising two sections one of which is hinged for relative movement with respect to the other section, and a rubber element having gripping portions embracing the adjacent section edges firmly and having a flexible portion intermediate of said gripping portions permitting relative movement therebetween, whereby said rubber element serves as a sealing element for the space between said window sections.

JOSEPH LEDWINKA.